US00RE40408E

(19) United States
(12) Reissued Patent
McConnell et al.

(10) Patent Number: US RE40,408 E
(45) Date of Reissued Patent: Jul. 1, 2008

(54) BABY WIPES WARMER FOR MAINTAINING MOISTURE AND COLORATION OF BABY WIPES CONTAINED THEREIN

(75) Inventors: Thomas E. McConnell, Santa Ynez, CA (US); Francois Hacquard, Los Angeles, CA (US); Michael E. Henley, Santa Ynez, CA (US); Gary L. Smith, Arroyo Grande, CA (US)

(73) Assignee: Prince Lionheart, Inc., Santa Maria, CA (US)

(21) Appl. No.: 11/657,985

(22) Filed: Jan. 25, 2007

Related U.S. Patent Documents

Reissue of:
(64) Patent No.: 6,847,011
Issued: Jan. 25, 2005
Appl. No.: 10/695,270
Filed: Oct. 28, 2003

U.S. Applications:
(63) Continuation of application No. 10/136,550, filed on May 1, 2002, now Pat. No. 6,639,185.

(51) Int. Cl.
*A47K 7/00* (2006.01)
*A47K 10/42* (2006.01)

(52) U.S. Cl. ..... 219/386; 219/401; 222/146.5; 221/150 A

(58) Field of Classification Search ..... None
See application file for complete search history.

(56) References Cited

U.S. PATENT DOCUMENTS

| | | | | | |
|---|---|---|---|---|---|
| 1,307,542 | A | * | 6/1919 | Elder | 118/41 |
| 1,659,185 | A | * | 2/1928 | Baker | 126/263.02 |
| 2,004,614 | A | * | 6/1935 | Meagher | 206/63.5 |
| 2,044,284 | A | * | 6/1936 | Dargavel | 118/425 |
| 2,443,321 | A | * | 6/1948 | Miner, Jr. | 68/5 R |
| 2,733,709 | A | * | 2/1956 | Sukacev | 126/262 |
| 2,806,591 | A | * | 9/1957 | Appleton | 225/106 |
| 2,840,266 | A | * | 6/1958 | Nelson | 221/48 |
| 2,854,134 | A | * | 9/1958 | Leo | 224/42.32 |
| 2,990,948 | A | * | 7/1961 | Zackheim | 206/439 |
| 3,084,664 | A | * | 4/1963 | Solomon et al. | 118/235 |
| 3,264,188 | A | * | 8/1966 | Gresham | 424/443 |

(Continued)

FOREIGN PATENT DOCUMENTS

| | | | |
|---|---|---|---|
| CA | 2176523 A | * | 11/1997 |
| CA | 2176523 | * | 11/1997 |
| JP | 8-24157 | * | 1/1996 |
| JP | 08-024157 A | * | 1/1996 |
| JP | 11-155755 A | * | 6/1999 |
| JP | 11-155755 | * | 6/1999 |
| JP | H11-225902 | | 8/1999 |
| JP | H11-225904 | | 8/1999 |
| JP | H11-299679 | | 11/1999 |
| JP | 2000-93341 | * | 4/2000 |
| JP | 2000-093341 A | * | 4/2000 |

*Primary Examiner*—J. Pelham
(74) *Attorney, Agent, or Firm*—Knobbe Martens Olson & Bear, LLP

(57) ABSTRACT

There is provided a baby wipes warmer comprising a housing which defines an upper housing wall. It also comprises a liquid tank assembly that has an upper tank surface defining at least one vapor aperture therethrough. The tank assembly is disposed within the hosing in a manner as to form an inside compartment between the upper housing wall and the upper tank surface. The warmer further comprises a heating element which is disposed within the housing to provide heat to the tank assembly. In this regard, a portion of liquid within the tank assembly transitions into vapors when heated by the heating element and flow to the inside compartment through the vapor aperture(s). By providing the vapors, the moisture and coloration of the baby wipes supported therein can be maintained while warming them.

22 Claims, 4 Drawing Sheets

U.S. PATENT DOCUMENTS 3,269,593 A * 8/1966 Madeleine et al. ..... 221/63
3,343,716 A * 9/1967 Meade ..... 221/46
3,368,522 A * 2/1968 Cordis ..... 118/43
3,369,698 A * 2/1968 Scholz ..... 221/48
3,383,012 A * 5/1968 Adell ..... 221/46
3,568,635 A * 3/1971 Poitras et al. ..... 118/122
3,592,161 A * 7/1971 Hoffman ..... 118/122
3,626,152 A * 12/1971 Governale et al. ..... 392/416
3,683,889 A * 8/1972 Hoffman ..... 126/263.07
3,726,395 A * 4/1973 Duhy ..... 206/449
3,775,801 A * 12/1973 Walker ..... 15/104.93
3,780,908 A * 12/1973 Fitzpatrick et al. ..... 221/48
3,784,055 A * 1/1974 Anderson ..... 221/46
3,843,017 A * 10/1974 Harrison ..... 221/63
3,849,629 A * 11/1974 Graham, Jr. ..... 219/521
3,862,616 A * 1/1975 Brady ..... 118/699
3,865,271 A * 2/1975 Gold ..... 221/96
3,868,052 A * 2/1975 Rockefeller ..... 225/106
3,902,044 A * 8/1975 Doyle et al. ..... 392/336
3,947,134 A * 3/1976 Ogawa ..... 401/118
3,986,479 A * 10/1976 Bonk ..... 118/506
4,017,002 A * 4/1977 Doyle et al. ..... 221/63
4,084,080 A * 4/1978 McMahan ..... 219/401
4,117,309 A * 9/1978 Cayley ..... 219/385
4,163,896 A * 8/1979 McAvinn et al. ..... 219/525
4,180,160 A * 12/1979 Ogawa et al. ..... 206/210
4,289,253 A * 9/1981 Andersson ..... 221/1
4,495,402 A * 1/1985 Burdick et al. ..... 219/214
4,694,973 A * 9/1987 Rose et al. ..... 221/46
4,700,048 A * 10/1987 Levy ..... 219/214
4,762,113 A * 8/1988 Hamasaki ..... 126/263.09
4,810,859 A * 3/1989 Anabtawi et al. ..... 219/535
4,943,705 A * 7/1990 Halloran ..... 219/385
4,947,026 A * 8/1990 Groom et al. ..... 219/401
5,210,396 A * 5/1993 Sanders ..... 219/521
D343,732 S * 2/1994 McConnell ..... D3/287
5,680,810 A * 10/1997 Sham ..... 99/330
5,738,082 A * 4/1998 Page et al. ..... 126/263.01
5,802,963 A * 9/1998 Cohn et al. ..... 99/476
5,869,812 A * 2/1999 Creamer et al. ..... 219/401
6,018,145 A * 1/2000 Moreno ..... 219/401
6,667,464 B2 * 12/2003 Ellis ..... 219/400

* cited by examiner

BABY WIPES WARMER FOR MAINTAINING MOISTURE AND COLORATION OF BABY WIPES CONTAINED THEREIN

Matter enclosed in heavy brackets [ ] appears in the original patent but forms no part of this reissue specification; matter printed in italics indicates the additions made by reissue.

CROSS-REFERENCE TO RELATED APPLICATIONS

The present application is a continuation of U.S. patent application Ser. No. 10/136,550 now U.S. Pat. No. 6,639,185 entitled BABY WIPES WARMER FOR MAINTAINING MOISTURE AND COLORATION OF BABY WIPES CONTAINED THEREIN filed May 1, 2002, the entirety of the disclosures of which are expressly incorporated herein by reference.

STATEMENT RE: FEDERALLY SPONSORED RESEARCH/DEVELOPMENT (Not Applicable)

BACKGROUND OF THE INVENTION

The present invention relates generally to baby wipes warmers, and more particularly to an improved baby wipes warmer having a liquid tank located therewithin which provides heated liquid vapors to the baby wipes for maintaining moisture and coloration of the baby wipes.

Baby wipes have been marketed in the United States for many years. Essentially, baby wipes are small pre-moistened paper or synthetic (non-woven) towelettes and are typically available in packages to the consuming public. They are primarily used to cleanse the skin of infants and small children. The wipe-fluid content for these pre-moistened wipes is generally comprised of cleansers, lotions and preservatives.

A few years after the baby wipes were introduced into the marketplace, various products for warming the wipes were made available to the public. Such products have been devised to comfort the baby wipe users from the inherent "chill" given off by the contact of the moistened wipes. For example, it is now a common practice for parents to employ the use of warm baby wipes on their children.

These warming products are generally electric operated and come in two distinct styles. One is an "electric blanket" style which is sized to wrap around the external surfaces of a plastic baby wipes container. The other is a self-contained plastic "appliance" style which warms the accommodated baby wipes with its internally positioned heating element. Though such currently known and available baby wipes warming products achieve their primary objective of warming baby wipes, they possess certain deficiencies which detract from their overall utility.

Perhaps the two greatest deficiencies of the prior art baby wipes warming products are the inabilities to sustain the moisture content and coloration of the baby wipes. More specifically, drying of the baby wipes occurs due to heating of their moisture which accelerates dehydration. Further, discoloration of the same appears to be inevitable because of a reaction of various chemicals in the wipes to heating. As such, even though these existing products may adequately warm the baby wipes, they cannot, however, seem to avoid the undesirable effects of dehydration and discoloration when warming them.

Thus, there exists a substantial need in the industry, and in the infant products manufacturing business in particular, for a baby wipes warming product that can effectively provide warmth to the baby wipes without dehydrating and/or discoloring them. Further, there exists a need for a baby wipes warming product which can achieve these objectives in a user-friendly and time-efficient manner.

BRIEF SUMMARY OF THE INVENTION

The present invention specifically addresses and overcomes the above-described deficiencies of prior art baby wipes warming products by providing an improved baby wipes warmer that can warm baby wipes while substantially maintaining their original moisture content and coloration. Briefly, in order to accomplish such objectives, the present baby wipes warmer may utilize a heatable liquid tank assembly which can provide liquid vapors to the baby wipes through its at least one vapor aperture. Alternatively, the present baby wipes warmer may use an elevated support surface such as a suspension tray in lieu of the tank assembly in which the baby wipes supported thereon can be heated while sustaining their moisture and color through vapors rising from the heated liquid pool disposed thereunderneath. These as well as other features of the present invention will be discussed in more detail infra.

In accordance with a first preferred embodiment of the present invention, there is provided a baby wipes warmer for warming baby wipes while substantially maintaining their original moisture content and coloration. Such warmer comprises a housing with a pivotally engaged lid member that can open and close relative thereto. A liquid tank assembly is disposed within the housing in such a way that its upper tank surface is vertically surrounded by the housing's interior-side housing wall and horizontally closed off by the lid member. In this respect, an inside compartment is defined which can be selectively accessed by opening and closing the lid member.

The liquid tank assembly is preferably fabricated from any heat conducting material such as metal (e.g., aluminum). The tank assembly comprises a liquid compartment which is formed between its upper and lower tank surfaces. The liquid compartment is used to hold any liquid that can produce vapors when heated such as water. By heating the liquid compartment, a portion of the liquid may change its physical state and flow into the inside compartment as vapors which helps to maintain the original moisture content and coloration of the baby wipes placed thereat. To allow the rising vapors to seep into the inside compartment from the liquid compartment, at least one vapor aperture is formed through the upper tank surface.

A heating element is disposed within the housing relative to the lower tank surface for the purpose of heating the liquid. The heating element may be located in various positions to achieve such purpose. For example, the heating element can be placed within the liquid compartment itself adjacent the lower tank surface to substantially extend thereabout. However, the heating element can also be placed outside the liquid compartment and still provide the requisite heat to the lower tank surface by being adjacent thereto. It is specifically contemplated herein that any types of heating element such as an electrically powered heating pad may be used.

In the first preferred embodiment, the upper tank surface is characterized by a generally flat support surface used for supporting the baby wipes thereon. This surface may be defined to be a part of the upper tank surface itself. In the alternative, however, the support surface can be formed by a suspension tray which is removably engaged upon a sponge material that extends through an exposed opening defined on the upper tank surface. If the latter configuration is used, the vapor aperture(s) of the upper tank surface is formed by the sponge itself as its inherent characteristics would allow the vapors to gradually flow therethrough. Moreover, a ridge may be formed around both types of support surfaces for confining the baby wipes within the physical boundary set thereby.

Further in the first preferred embodiment of the present invention, there may be provided a liquid reservoir which is set in fluid communication with the liquid compartment. The liquid reservoir may be disposed within the housing adjacent the liquid tank assembly, or alternatively mounted to an exterior of the housing. To establish fluid communication, any elongated and hollowed structure such as a conduit may be used to provide a flow channel between the reservoir and the liquid compartment. As will be demonstrated below, the liquid reservoir ensures that the liquid within the liquid compartment is always sustained at a certain level sufficient to provide adequate evaporation.

In accordance with a second preferred embodiment of the present invention, there is provided a baby wipes warmer which utilizes an elevated support surface such as a suspension tray in lieu of the tank assembly. The support surface is disposed within an inside compartment which is collectively formed by the interior-side housing wall and the upper housing wall. More specifically, the interior-side housing wall defines a generally flattened interior compartment surface used for placing the support surface thereon above the liquid level contained within the inside compartment. By doing so, the baby wipes accommodated thereon can be heated while sustaining their moisture and color through vapors rising from the heated liquid pool disposed underneath.

In accordance with a third preferred embodiment of the present invention, a liquid tank assembly in the form of an elongated central channel is embedded laterally along the flattened interior compartment surface. This assembly forming the elongated central channel includes a sponge material therewithin so that it may draw liquid out of the reservoir by capillarity. Similar to the first embodied baby wipes warmer, its upper tank surface comprises at least one vapor aperture which allows liquid vapor to travel therethrough.

In illustrating the operation for all embodied baby wipes warmers, a stack of baby wipes may be placed within the inside compartment simply by opening and then closing the lid member. The liquid contained within the baby wipes warmer should be checked to ensure that there is sufficient quantity, i.e., water level present. This can be accomplished by checking the liquid reservoir (for the first and third embodiments) or the liquid level within the inside compartment itself (for the second embodiment). Thereafter, the baby wipes warmer may be plugged into an electrical outlet in order to activate the heating element (if not already done). By following this easy-to-follow procedure, portions of the liquid can transition into vapors when sufficiently heated which then travel upwardly through the vapor aperture(s) to contact the baby wipes so that they may be maintained in constant moisturized conditions and coloration.

BRIEF DESCRIPTION OF THE DRAWINGS

These as well as other features of the present invention will become more apparent upon reference to the drawings wherein.

DETAILED DESCRIPTION OF THE INVENTION

Figure 1:
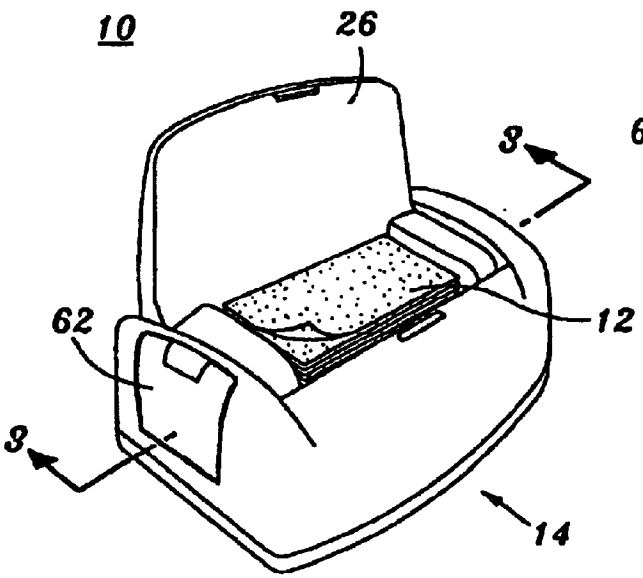
FIG. 1 is a perspective view of a baby wipes warmer constructed in accordance with a first preferred embodiment of the present invention and illustrating a stack of baby wipes positioned within its inside compartment.

Referring now to the drawings wherein the showings are for purposes of illustrating preferred embodiments of the present invention only, and not for purposes of limiting the same, FIG. 1 prospectively illustrates a baby wipes warmer 10 constructed in accordance with a first preferred embodiment of the present invention. As indicated above, the baby wipes warmer 10 is adapted to warm a stack of baby wipes 12 accommodated therein while maintaining the wipes 12 in a substantially moisturized condition and with their original coloration (i.e., white). Those of ordinary skill in the art will recognize that the baby wipes warmer 10 may be formed to have a variety of external housing shapes, configurations, geometries, sizes and textures other than for that shown in the provided figures.

Figure 2:
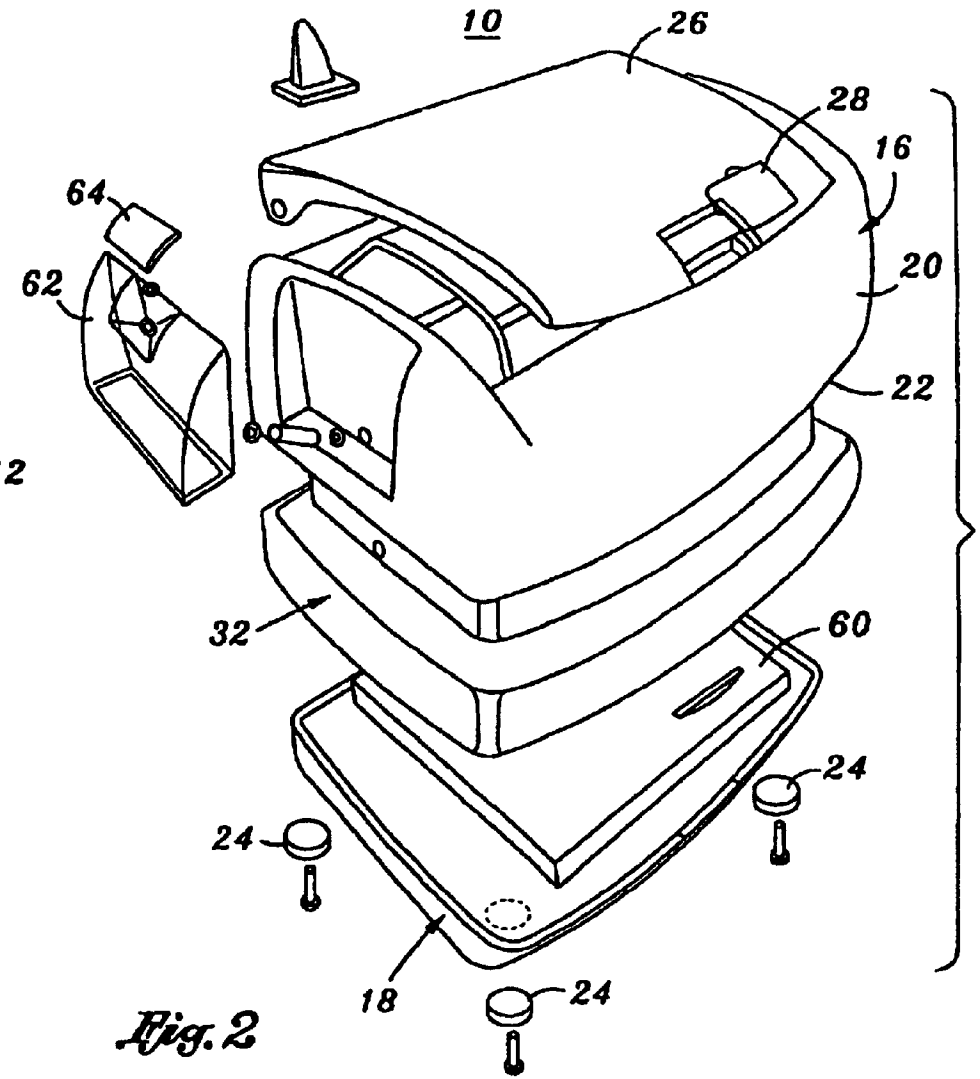
FIG. 2 is an exploded perspective view of the baby wipes warmer of FIG. 1 and illustrating a liquid reservoir which is exteriorly mountable to its exterior-side housing wall.

Referring more particularly to FIGS. 1 and 2, the baby wipes warmer 10 comprises a housing 14. This housing 14 may be fabricated from any rigid material, but plastic polymer is preferred. The housing 14 is formed having a main body member 16 and a base member 18. More particularly, the body member 16 is peripherally defined by an exterior-side housing wall 20 with a base end 22 that engages onto the base member 18. The base member 18 is contemplated to be used for supporting the baby wipes warmer 10 on any provided surface (e.g., desktop, floor, night stand, etc.) and may optionally include a plurality of adjustable foot pads 24 for this purpose.

The housing 14 of the present baby wipes warmer 10 comprises a pivotally engaged top lid member 26 which is capable of opening and closing relative to the housing 14. The lid member 26 may open and close utilizing any conventional methods such as using a door spring 28, for example. When such lid member 26 is closed with respect to the housing 14, it becomes an upper housing wall as it encloses the interior of the housing 14 from the outside. On the other hand, the opening of the lid member 26 allows access to an inside compartment 30 of the housing which will be discussed in more detail below. By accessing the inside compartment 30, a stack of baby wipes 12 (layered or interfolded stack) may be inserted and individually withdrawn for use.

Figure 3:
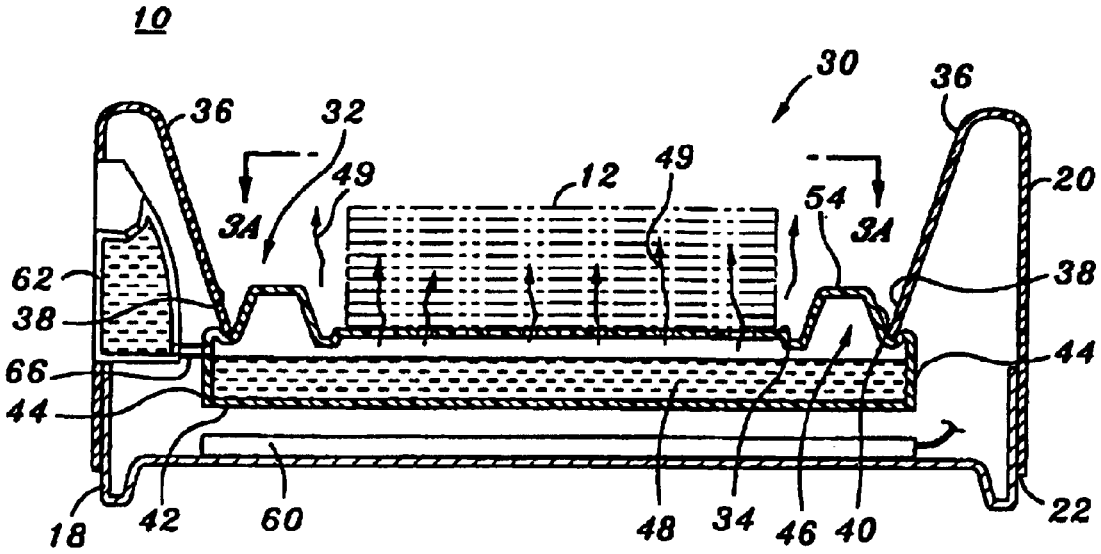
FIG. 3 is a cross-sectional view of the baby wipes warmer of FIG. 1 and illustrating a heating element disposed between its water tank assembly and base member.

Referring now to FIGS. 2 and 3, a liquid tank assembly 32 is provided within the housing 14. More specifically, the liquid tank assembly 32 is located between the body and base members 16, 18 when they are engaged to each other in the manner described above. Upon such placement, the upper tank surface 34 of the tank assembly 32 collectively forms the inside compartment 30 with the interior-side housing wall 36 and the lid member 26 of the housing 14. To describe this aspect in more detail, the upper tank surface 34 becomes vertically surrounded as the tank end 38 of the interior-side housing wall 36 is rested against the upper tank peripheral edge 40 thereof. The upper tank surface 34 is then horizontally closed off by the top lid member 26 forming the closed position. By such structural interaction, the requisite inside compartment 30 may be formed.

Although FIG. 2 illustrates the liquid tank assembly 32 to be generally rectangular in configuration, it is expressly stated herein that the tank assembly 32 may be configured in other ways without deviating from its operational capabilities.

The liquid tank assembly 32 defines a lower tank surface 42 which is positioned beneath the upper tank surface 34 towards the base member 18. The upper and lower tank surfaces 34, 42 are connected to each other by a surrounding side tank surfaces 44 to thereby form a liquid compartment 46 within the tank assembly 32. This liquid compartment 46 is used for holding any liquid 48 that can evaporate when sufficiently heated and thus produce vapors 49 which are able to moisturize. A type of liquid 48 which is exemplary of this nature is water. However, the use of any fluids which may safely moisturize the baby wipes 12 are foreseeable.

Because the contained liquid 48 must evaporate upon sufficient heating, the liquid tank assembly 32 should therefore be made from any material that is capable of rising in temperature in reaction to heating. It is preferred that the tank assembly 32 is fabricated from a heat-conducting material such as metal. More preferably, aluminum would be desirable for fabricating the tank assembly 32 as it reacts very well to heating.

Figure 3A:
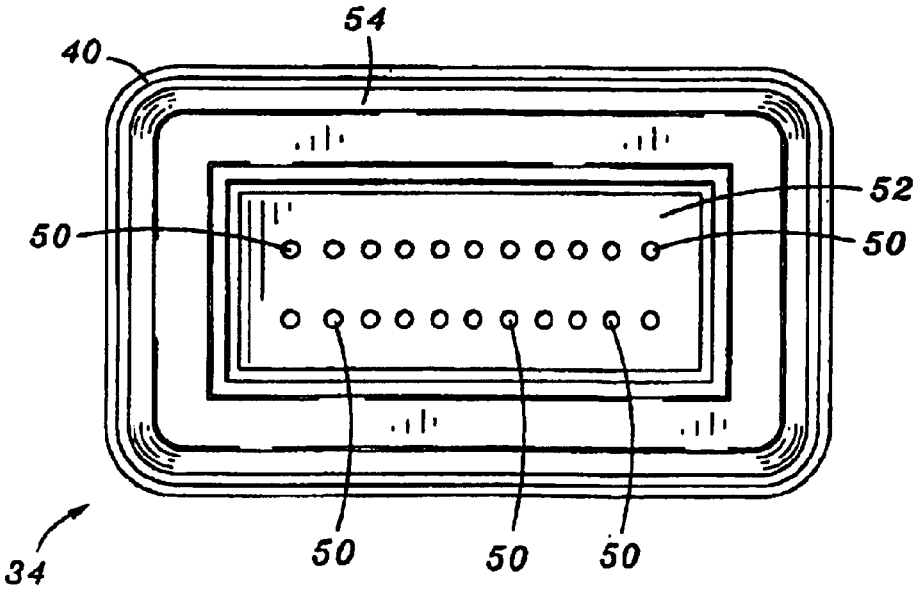
FIG. 3A is a plan view of the water tank assembly of FIG. 3 and illustrating a plurality of vapor apertures which are formed through its upper tank surface.

As shown in FIGS. 3 and 3A, the upper tank surface 34 includes a plurality of vapor apertures 50 extending therethrough which provide fluid communication between the inside and liquid compartments 30, 46. The vapor apertures 50 allow the vapors 49 to pass through from the liquid compartment 46 to the inside compartment 30 so as to heat the wipes and maintain the baby wipes 12 in a constant moisturized condition and coloration. Preferably, the vapor apertures 50 are formed within the support surface 52 which is surrounded by a ridge 54 formed therearound. The support surface 52 is primarily used for accommodating the baby wipes 12 in which the surrounding ridge 54 confines them in place to prevent side-to-side movement.

Figure 5:
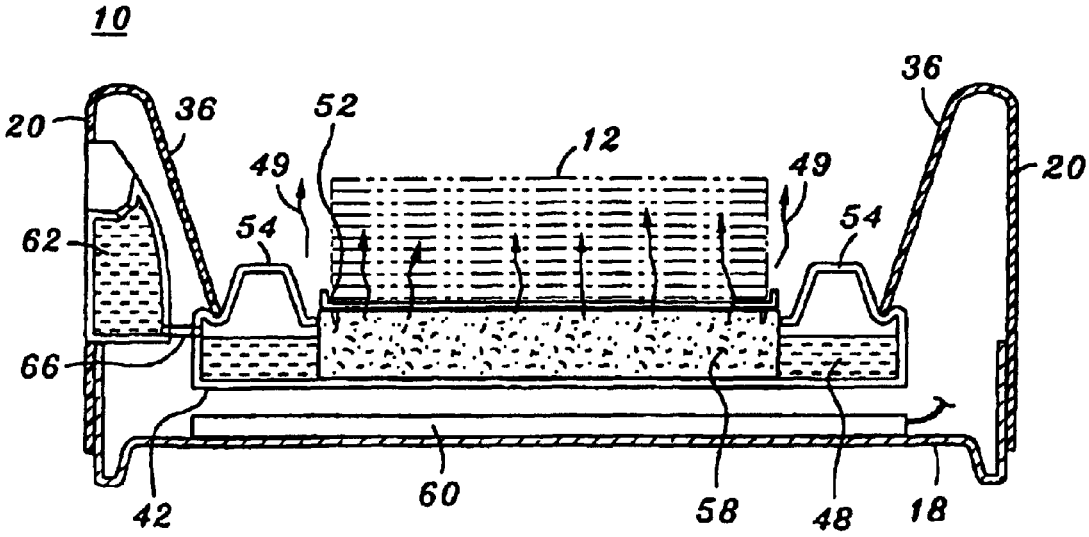
FIG. 5 is a cross-sectional view of the baby wipes warmer of FIG. 1 and illustrating a suspension tray which is placed upon a sponge extending through an exposed opening of its water tank assembly.

Referring now to FIG. 5 only, an alternative embodiment of the support surface 52 is depicted. In this embodiment, the upper tank surface 34 may instead define an exposed opening 56 between the ridge 54. A support surface 52 may be disposed within this opening 56 in a manner as to extend substantially thereabout. Any structure providing a horizontal flat surface can be defined as the support surface 52 such as a suspension tray, for example. Preferably, a sponge material 58 extending through the exposed opening 56 from the liquid compartment 46 is used to removably secure the support surface 52 in place. The sponge 58 is preferred for this purpose as its naturally formed pores may simulate the vapor apertures 50 thereby permitting the vapors 49 to seep therethrough.

Figure 4:
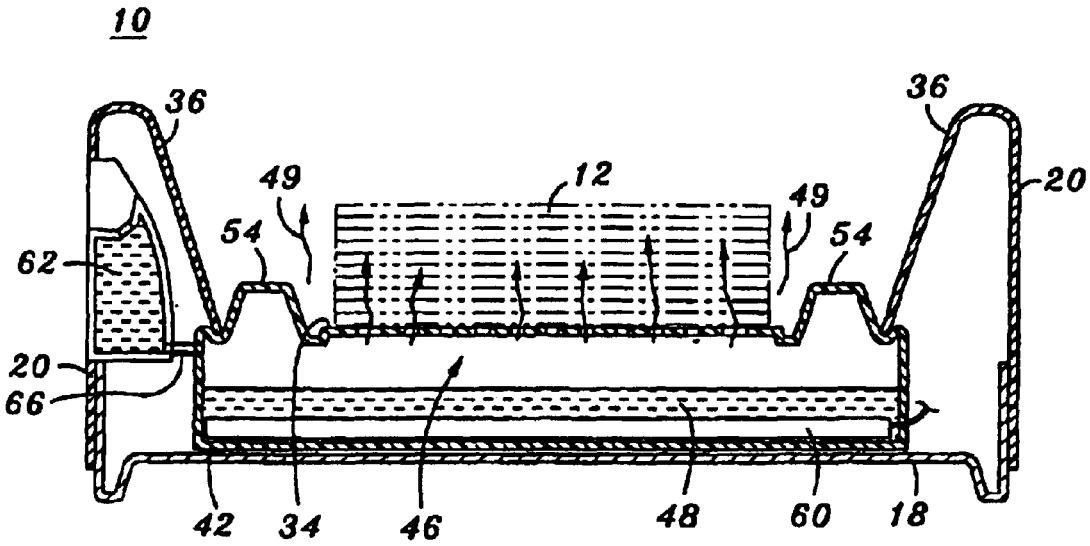
FIG. 4 is a cross-sectional view of the baby wipes warmer of FIG. 1 and illustrating a heating element immersed in a quantity of liquid contained within its water tank assembly.

Referring now to FIGS. 3-5, a heating element 60 is provided within the housing 14 relative to the lower tank surface 42. As noted above, the purpose of the heating element 60 is to heat the tank assembly 32 so that portions of liquid 48 are changed into vapors 49. The heating element 60 may be disposed in various positions to achieve this purpose. One position is to locate the heating element 60 within the liquid compartment 46 so that it is immersed in liquid 48 to substantially extend adjacent the lower tank surface 42 (best shown in FIG. 4). The heating element 60 may also be positioned outside the liquid compartment 48 to extend adjacent the lower tank surface 42 (best shown in FIGS. 3 and 5). Although the use of various heaters is contemplated, it is preferred that an electrically powered heating pad is utilized.

Referring now back to FIGS. 1 and 2, a liquid reservoir 62 may optionally be incorporated into the present baby wipes warmer 10. However, the use of the liquid reservoir 62 is not mandatory as the liquid level within the liquid compartment 46 may be manually refilled. The liquid reservoir 62 is in fluid communication with the liquid compartment 46. By such communication, the reservoir 62 can provide additional liquid to the liquid compartment 46 when needed. The additional liquid may be provided manually by operation of a valve device which may open and close the liquid flow into the liquid compartment 46. The liquid reservoir 62 includes a refill cap 64 preferably fabricated from a rubber material for selectively accessing its interior.

Similar to the heating element 60, the liquid reservoir 62 may also be located in multiple positions. For example, it can be disposed within the housing 14 adjacent the liquid tank assembly 32 (shown in FIG. 7). Alternatively, the liquid reservoir 62 may be exteriorly mounted to the exterior-side housing wall 20 (shown in FIG. 1). Irrespective of its positioning, the important concept to be derived is that the reservoir 62 fluid communicates with the liquid compartment 46 for providing additional liquid 48 thereto when needed. To establish fluid communication, any elongated and tubular structure 66 such as a conduit may be used to form a reservoir channel 66 between the reservoir 62 and the liquid compartment 46. In this respect, the liquid reservoir 62 ensures that the liquid 48 within the liquid compartment 46 is always kept at a certain level which is sufficient to provide adequate evaporation.

Figure 6:
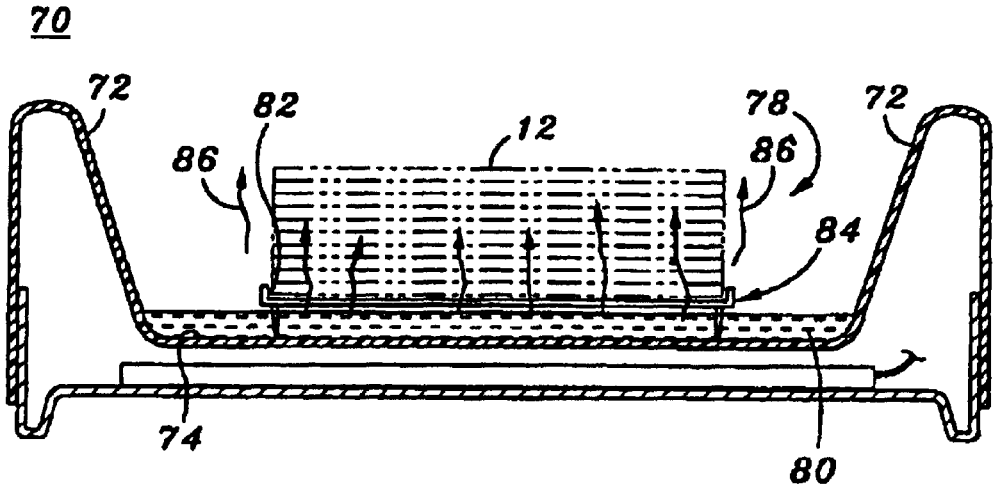
FIG. 6 is a cross-sectional view of a baby wipes warmer constructed in accordance with a second preferred embodiment of the present invention and illustrating a suspension tray which is placed directly over a quantity of liquid contained within its inside compartment.

FIG. 6 illustrates a baby wipes warmer 70 which is constructed in accordance with a second preferred embodiment. The second embodied baby wipes warmer 70 is substantially identical to the first embodiment with one major distinction. More specifically, the baby wipes warmer 70 of the second embodiment eliminates the use of the liquid tank assembly 32. Rather, its interior-side housing wall 72 is adapted to define a substantially flattened interior compartment surface 74 which extends generally parallel to the base member 18. By merely closing the top lid member (not shown), an inside compartment 78 is formed. A quantity of liquid 80 is directly contained within this compartment 78.

A support surface 82 which is defined by a suspension tray 84 is disposed within the inside compartment 78. However, it should be noted that the support surface 82 is positioned above the pool of liquid 80 as it must accommodate the baby wipes 12 thereon. The support surface 82 may be engaged upon the interior compartment surface 74 through any known process such as bonding or fastening. By utilizing this arrangement, the baby wipes 12 are adequately heated while sustaining their moisture and color through vapors 86 rising from the heated liquid pool 80 disposed immediately underneath the support surface 82.

Figure 7:
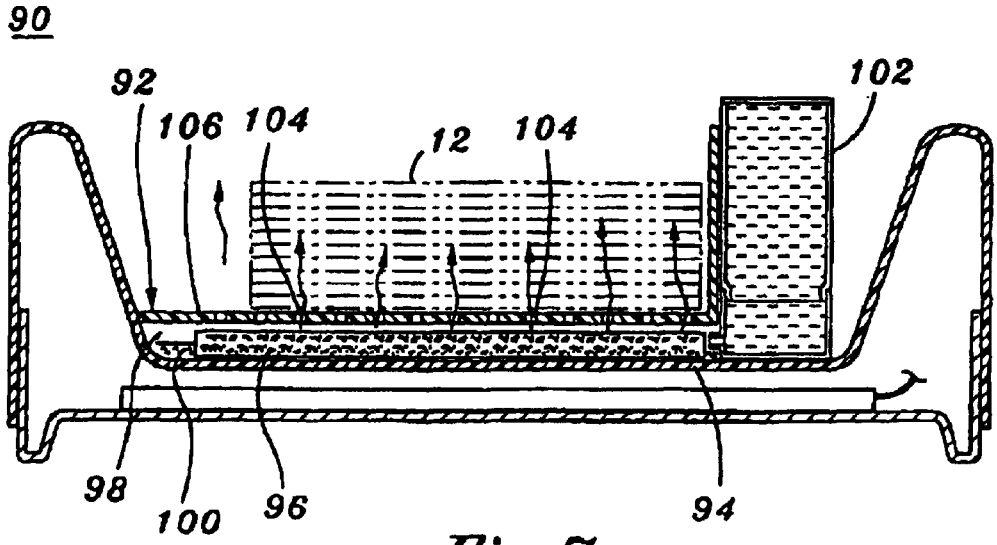
FIG. 7 is a cross-sectional view of a baby wipes warmer constructed in accordance with a third preferred embodiment of the present invention and illustrating a sponge disposed within its water tank assembly which is in the form of a laterally extending central water channel.

FIG. 7 shows a baby wipes warmer 90 which is made in accordance with a third preferred embodiment of the present invention. This warmer 90 is substantially identical to the first embodied baby wipes warmer 10 except that its liquid tank assembly 92 is fabricated in the form of an elongated central channel and is embedded laterally along the interior compartment surface 94. This elongated central channel serving as the liquid tank assembly 92 includes a sponge 96 within its liquid compartment 98. The sponge 96 operates to draw the liquid 100 out of the adjacently located liquid reservoir 102 by capillarity. Similar to the tank assembly 32 of the first embodiment, its upper tank surface 104 includes a plurality of vapor holes 106 which allow the liquid 100 to evaporate therethrough.

The operation of the first embodied baby wipes warmer 10 is described herein which is simultaneously representative for operations of the second and third embodied baby wipes warmers 70, 90. First, a stack of baby wipes 12 to be warmed is placed within the inside compartment 30 simply by opening and then closing the lid member 26. The liquid 48 contained within the baby wipes warmer 10 should be checked to ensure that there is sufficient level present for adequate evaporation. This can be accomplished by visually checking the liquid reservoir (for the first and third embodiments) or the liquid level within the inside compartment itself (for the second embodiment). Thereafter, the baby wipes warmer 10 should be plugged into an electrical outlet (not shown) in order to activate the heating element 60 (if not already done). By following this easy-to-follow procedure, portions of the liquid 48 can transition into vapors 49 when sufficiently heated which are then provided to the baby wipes 12 so that they may be maintained in constant moisturized condition and coloration.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An [apparafus] *apparatus* for moisturizing and warming at least one wipe, the apparatus comprising:

a housing comprising at least two housing members which are sized and configured to engage with each other to form an inside compartment therebetween;

a liquid container assembly [disposed within] *in fluid communication with* the inside compartment of the housing between the at least two housing members thereof, the liquid container assembly being fixedly engaged to at least one of the housing members and having at least one aperture therethrough; [and]

a heating element disposed within [the inside compartment of] the housing between the at least two housing members thereof;

*a sponge in fluid communication with liquid disposed within the liquid container assembly; and* wherein a portion of liquid is dispensable through the at least one aperture of the liquid container assembly for moisturizing the at least one wipe, and wherein heat is acquirable from the heating element for warming the at least one wipe, the liquid including anti-microbial additives.

2. The apparatus of claim 1 wherein the housing is fabricated from a plastic material.

3. The apparatus of claim 1 wherein the at least two housing members comprise a body member and a base member.

4. The apparatus of claim 3 wherein the body member is peripherally defined by an exterior-side housing wall having a base end, the base end being engaged with the base member.

5. The apparatus of claim 1 wherein the housing defines an upper housing wall.

6. The apparatus of claim 5 wherein the upper housing wall is an openable/closeable lid member pivotally engaged to the housing for selectively providing access to the inside compartment thereof.

7. The apparatus of claim 1 wherein the liquid container assembly is fabricated from a heat conducting material.

8. The apparatus of claim 7 wherein the heat conducting material is metal.

9. The apparatus of claim 1 wherein the liquid container assembly is a liquid reservoir for storing a quantity of liquid therein.

10. The apparatus of claim 1 wherein the liquid container assembly is a liquid tank for storing a quantity of liquid therein.

11. The apparatus of claim 1 wherein the liquid is water.

12. The apparatus of claim 1 wherein the liquid is anti-microbial liquid.

13. The apparatus of claim 1 wherein the liquid container assembly has upper and lower surfaces, the liquid container assembly forming a liquid compartment between the upper and lower surfaces thereof for storing a quantity of liquid therein.

14. The apparatus of claim 13 wherein the at least one aperture is extended through the liquid container assembly in a manner as to fluidly communicate the inside compartment and the liquid compartment with each other.

15. The apparatus of claim 1 wherein the at least one wipe is at least one fabric wipe.

16. The apparatus of claim 1 wherein the at least one wipe is at least one baby wipe.

17. The apparatus of claim 1 wherein the heating element is disposed adjacent the liquid container assembly.

*18. The apparatus of claim 1 wherein the liquid container assembly is permanently attached to at least one of the housing members.*

*19. The apparatus of claim 1 wherein the liquid container assembly is disposed within the inside compartment of the housing.*

*20. An apparatus for moisturizing and warming at least one wipe, the apparatus comprising:*

*a housing comprising at least two housing members which are sized and configured to engage with each other to form an inside compartment there between;*

*a liquid reservoir in fluid communication with the inside compartment of the housing between the at least two housing members thereof, the liquid reservoir being fixedly engaged to at least one of the housing members and disposed exterior to the housing, the liquid reservoir having at least one aperture therethrough; and*

*a heating element disposed within the housing between the at least two housing members thereof;*

*wherein a portion of liquid is dispensable through the at least one aperture of the liquid reservoir for moisturizing the at least one wipe, and wherein heat is acquirable from the heating element for warming the at least one wipe, the liquid including anti-microbial additives.*

*21. The apparatus of claim 20 wherein the liquid reservoir is permanently attached to the at least one of the housing members.*

*22. The apparatus of claim 20 wherein the liquid reservoir is disposed laterally adjacent to the inside compartment.*

* * * * *